US012651030B2

(12) United States Patent
Marmor et al.

(10) Patent No.: US 12,651,030 B2
(45) Date of Patent: Jun. 9, 2026

(54) METHOD FOR ACCELERATING WEB CONTENT DELIVERY

(71) Applicant: Radware Ltd., Tel Aviv (IL)

(72) Inventors: Amir Marmor, Arugot (IL); Alon Tamir, Kiryat Ono (IL)

(73) Assignee: Radware Ltd., Tel Aviv (IL)

( * ) Notice: Subject to any disclaimer, the term of this patent is extended or adjusted under 35 U.S.C. 154(b) by 27 days.

(21) Appl. No.: 18/508,636

(22) Filed: Nov. 14, 2023

(65) Prior Publication Data

US 2025/0156496 A1    May 15, 2025

(51) Int. Cl.
*H04L 12/24* (2006.01)
*G06F 16/957* (2019.01)
*H04L 41/0803* (2022.01)

(52) U.S. Cl.
CPC ................................ *G06F 16/9574* (2019.01)

(58) Field of Classification Search
CPC .................................................. G06F 16/9574
USPC ........................................................ 709/203
See application file for complete search history.

(56) References Cited

U.S. PATENT DOCUMENTS

| | | | | |
|---|---|---|---|---|
| 9,158,845 B1 * | 10/2015 | Reddy | ................... | G06F 16/951 |
| 2008/0228772 A1 * | 9/2008 | Plamondon | ......... | G06F 16/9574 |
| 2011/0029641 A1 * | 2/2011 | Fainberg | ................ | H04L 67/02 |
| | | | | 709/224 |
| 2016/0173635 A1 * | 6/2016 | Kolam | ................ | G06F 16/9574 |
| | | | | 709/217 |
| 2016/0191651 A1 * | 6/2016 | Balakrishnan | ...... | H04L 67/2895 |
| | | | | 709/219 |
| 2017/0048344 A1 * | 2/2017 | Cai | ......................... | H04L 67/01 |
| 2018/0097905 A1 * | 4/2018 | Todasco | ................... | H04L 67/02 |
| 2018/0337972 A1 * | 11/2018 | Lepeska | .............. | G06F 16/9574 |
| 2022/0138279 A1 * | 5/2022 | Lepeska | ................. | H04L 67/02 |
| | | | | 709/213 |
| 2022/0188574 A1 * | 6/2022 | Benkreira | ............ | G06N 3/0464 |
| 2024/0205473 A1 * | 6/2024 | Tian | ................... | H04N 21/2402 |

* cited by examiner

*Primary Examiner* — Ario Etienne
*Assistant Examiner* — Elizabeth Kassa
(74) *Attorney, Agent, or Firm* — M&B IP Analysts, LLC

(57) ABSTRACT

A system and method for accelerating web content delivery are disclosed. The method includes capturing a request to access a webpage hosted by a web server, the request is initiated by a web browser; determining if there are resources in the requested webpage cached locally at a cache memory of the web browser; retrieving cached resources that are locally cached at the web browser; retrieving uncached resources from the web server; and rendering the webpage on the webpage from the cached resources and the uncached resources.

25 Claims, 5 Drawing Sheets

<u>400</u> receive a list of predicted webpages, wherein a predicted webpage is a webpage that has not been requested yet by a user of the web browser;
S410 proactively retrieve from the web server uncached resources for webpages in the predicted webpages; and
S420 dynamically update the local cache with the retrieved uncached resources.
S430

300

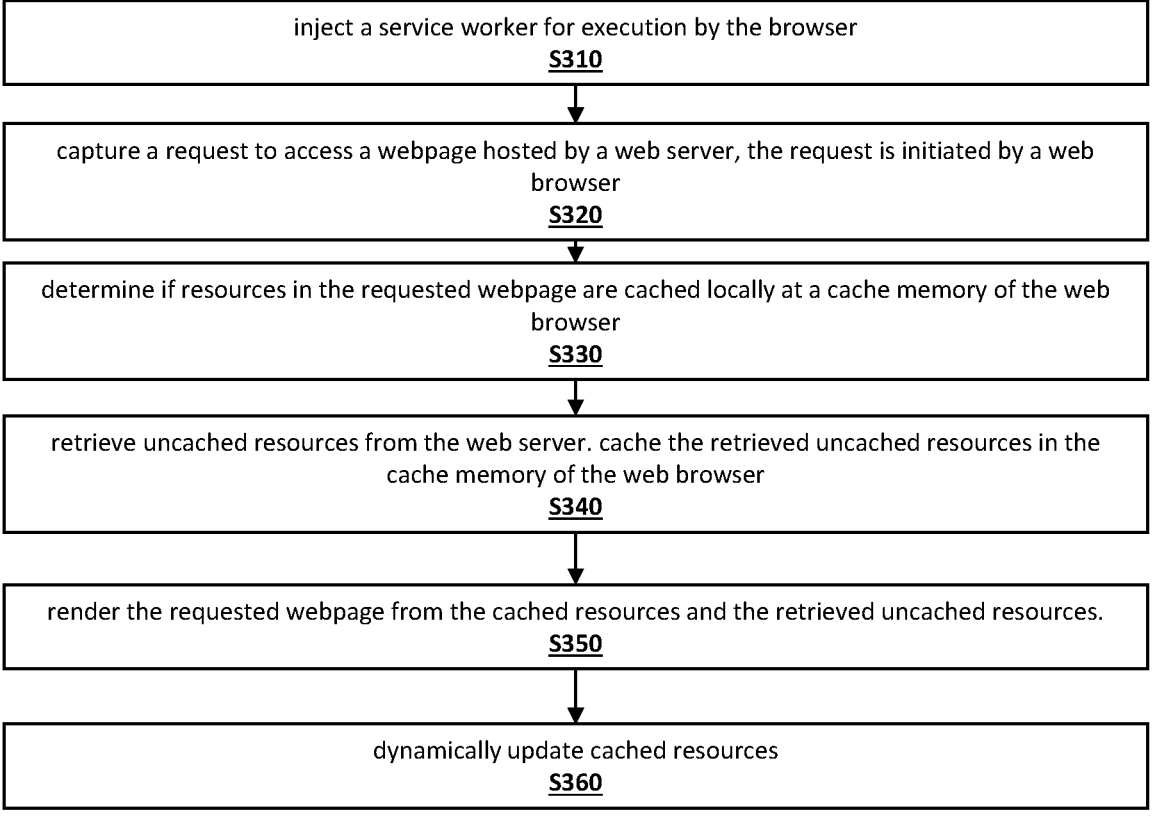

inject a service worker for execution by the browser
S310 capture a request to access a webpage hosted by a web server, the request is initiated by a web browser
S320 determine if resources in the requested webpage are cached locally at a cache memory of the web browser
S330 retrieve uncached resources from the web server. cache the retrieved uncached resources in the cache memory of the web browser
S340 render the requested webpage from the cached resources and the retrieved uncached resources.
S350 dynamically update cached resources
S360

FIG. 3

400 receive a list of predicted webpages, wherein a predicted webpage is a webpage that has not been
requested yet by a user of the web browser;
S410 proactively retrieve from the web server uncached resources for webpages in the predicted
webpages; and
S420 dynamically update the local cache with the retrieved uncached resources.
S430

METHOD FOR ACCELERATING WEB CONTENT DELIVERY

TECHNICAL FIELD

This disclosure generally relates to web content delivery and, more particularly, for techniques for accelerating web content delivery.

BACKGROUND

A CDN (content delivery network) is a distributed network of servers located in multiple data centers across the globe. The primary purpose of a CDN is to efficiently deliver web content, such as images, videos, scripts, and other static or dynamic files, to users based on their geographical location.

CDNs help improve website performance by reducing latency and the time it takes to load content. When a user requests a file from a website, the CDN automatically identifies the server closest to the user's location and delivers the content from that server instead of serving it from the website's origin server, which may be located far away. This reduces the distance between the user and the server, resulting in faster content delivery.

CDN services charge content providers for each user request for a file from a website. The increasing demand for content, especially online streaming services, has made the cost of CDN services almost impractical for content providers. However, the popularity of CDN services necessitates vendors to expand their services and bandwidth, leading to increased investment in the infrastructure. If the vendor fails to meet the demand for CDN services, it may result in a decline in performance quality.

Web browsers are equipped with local cache memory (simply cache). The browser cache helps improve website performance and user experience by reducing the amount of data that needs to be downloaded and processed. Browser cache also reduces the load on the web server, as cached resources can be served directly from the local cache instead of the server.

However, the browser cache is static, which can sometimes cause issues, such as displaying outdated content or not reflecting recent changes made to a website. That is, as designed today, browser cache cannot dynamically update cached data, and those cannot replace or function instead of CDNs.

Therefore, it would be advantageous to provide an efficient solution for improving the performance of web browsers while minimizing access to CDN services.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include capturing a request to access a webpage hosted by a web server, the request is initiated by a web browser; determining if there are resources in the requested webpage cached locally at a cache memory of the web browser; retrieving cached resources that are locally cached at the web browser; retrieving uncached resources from the web server; and rendering the webpage on the webpage from the cached resources and the uncached resources. Other embodiments of this aspect include corresponding computer systems, apparatus, and computer programs recorded on one or more computer storage devices, each configured to perform the actions of the methods.

Implementations may include one or more of the following features. The method may include: caching the retrieved uncached resources in the cache memory of the web browser; and updating a cached resource table indicating attributes related to the retrieved uncached resources. The method where the attributes related to a cached resource includes: a webpage including the cached resource, a resource name, an access time of a resource, and a timestamp of a last update. The method may include: determining if a previously requested webpage has been modified; proactively retrieving from the web server modified resources; and dynamically updating cached with the retrieved modified resources. The method may include: receiving a list of predicted webpages, where a predicted webpage is a webpage that has not been requested yet by a user of the web browser; proactively retrieving from the web server uncached resources for webpages in the predicted webpages; and dynamically updating the local cache with the retrieved uncached resources. The method may include: providing statistics on a navigation history of a user of the web browser, where the list of predicted webpages is determined based on the navigation history of a plurality of users of multiple different web browsers. The method may include: providing statistics on the navigation history of a user of the web browser. The method may include: initiating a service worker on the web browser; and controlling, by a CDN agent, the service worker to update the cache. Method may include retrieving the locally cached resources further may include: at a predefined schedule, checking a timestamp indicating a recent update time for each cached resource to determine aging cached resource; and dynamically updating aged, cached resources. Method may include retrieving the uncached resources from the web server further may include: retrieving the uncached resources from an external CDN server. The method may include: the method is performed by a CDN agent. The method may include: injecting, by an external, to the web browser the CDN agent in response to the request to the web server. Implementations of the described techniques may include hardware, a method or process, or a computer tangible medium.

In one general aspect, non-transitory computer-readable medium may include one or more instructions that, when executed by one or more processors of a device, cause the device to: capture a request to access a webpage hosted by a web server, the request is initiated by a web browser. Non-transitory computer-readable medium may also include determining if there are resources in the requested webpage cached locally at a cache memory of the web browser. The medium may furthermore include retrieving cached resources that are locally cached in the web browser. Medium may, in addition, include retrieving uncached resources from the web server. Medium may moreover include rendering the webpage on the webpage from the cached resources and the uncached resources. Other embodiments of this aspect include corresponding computer systems, apparatus, and computer programs recorded on one or more computer storage devices, each configured to perform the actions of the methods.

In one general aspect, the system may include one or more processors configured to: capture a request to access a webpage hosted by a web server, the request is initiated by a web browser. The system may furthermore include determining if there are resources in the requested webpage cached locally at a cache memory of the web browser. The system may in addition, include retrieving cached resources that are locally cached at the web browser. The system may moreover include retrieving uncached resources from the web server. The system may also include rendering the webpage on the webpage from the cached resources and the uncached resources. Other embodiments of this aspect include corresponding computer systems, apparatus, and computer programs recorded on one or more computer storage devices, each configured to perform the actions of the methods.

Implementations may include one or more of the following features. System where the one or more processors are further configured to: cache the retrieved uncached resources in the cache memory of the web browser; and update a cached resource table indicating attributes related to the retrieved uncached resources. The system where the attributes related to a cached resource includes: a webpage including the cached resource, a resource name, an access time of a resource, and a timestamp of a last update. The system where one or more processors are further configured to: determine if a previously requested webpage has been modified; proactively retrieve from the web server modified resources; and dynamically update cached with the retrieved modified resources. The system where the one or more processors are further configured to: receive a list of predicted webpages, where a predicted webpage is a webpage that has not been requested yet by a user of the web browser; proactively retrieve from the web server uncached resources for webpages in the; predicted webpages; and dynamically update the local cache with the retrieved uncached resources. The system where the one or more processors are further configured to: provide statistics on a navigation history of a user of the web browser, where the list of predicted webpages is determined based on the navigation history of a plurality of users of multiple different web browsers. The system where the one or more processors are further configured to: provide statistics on the navigation history of a user of the web browser. System where the one or more processors are further configured to: initiate a service worker on the web browser; and control, by a CDN agent, the service worker to update the cache. The system where the one or more processors, when retrieving the locally cached resources, are configured to: at a predefined schedule, check a timestamp indicating a recent update time for each cached resource to determine aging cached resource; and dynamically update aged, cached resources. The system where the one or more processors, when retrieving the uncached resources from the web server, are configured to: retrieve the uncached resources from an external CDN server. The system where the one or more processors are further configured to: inject, by an external, to the web browser the CDN agent in response to the request to the web server. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

Figure 1:
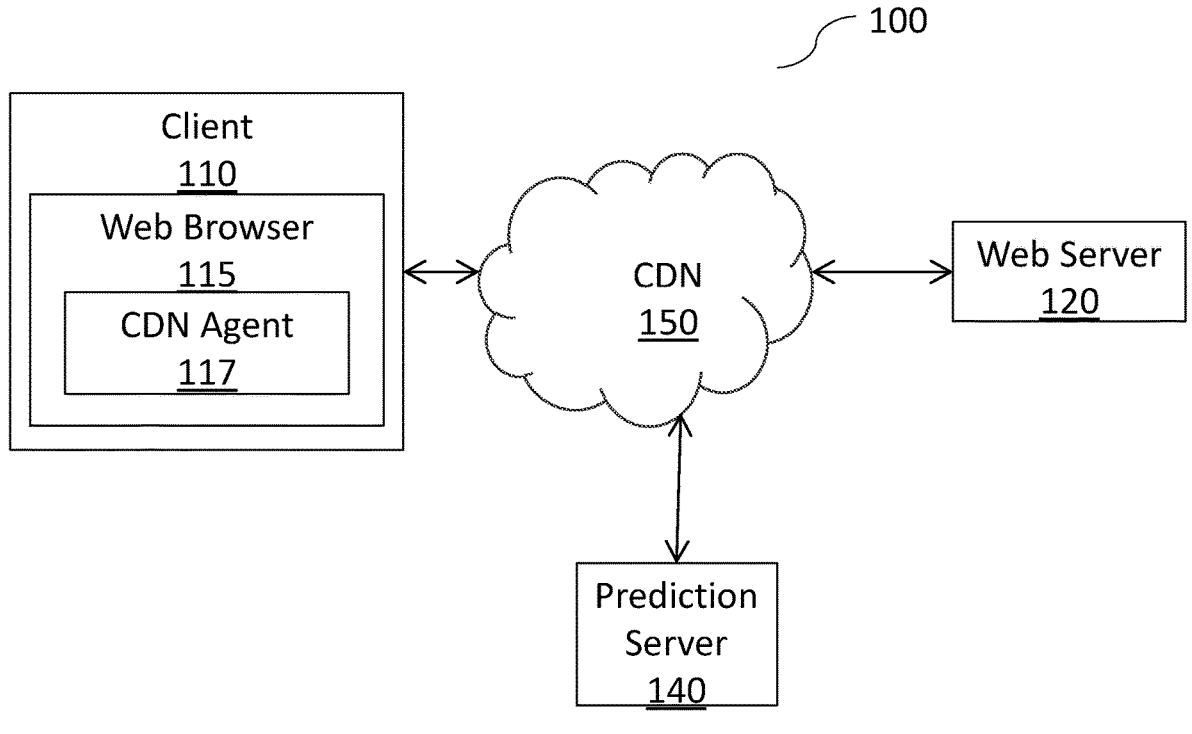

FIG. 1 is a network diagram utilized to describe the various disclosed embodiments for accelerating web content delivery using a local CDN.

Figure 2:
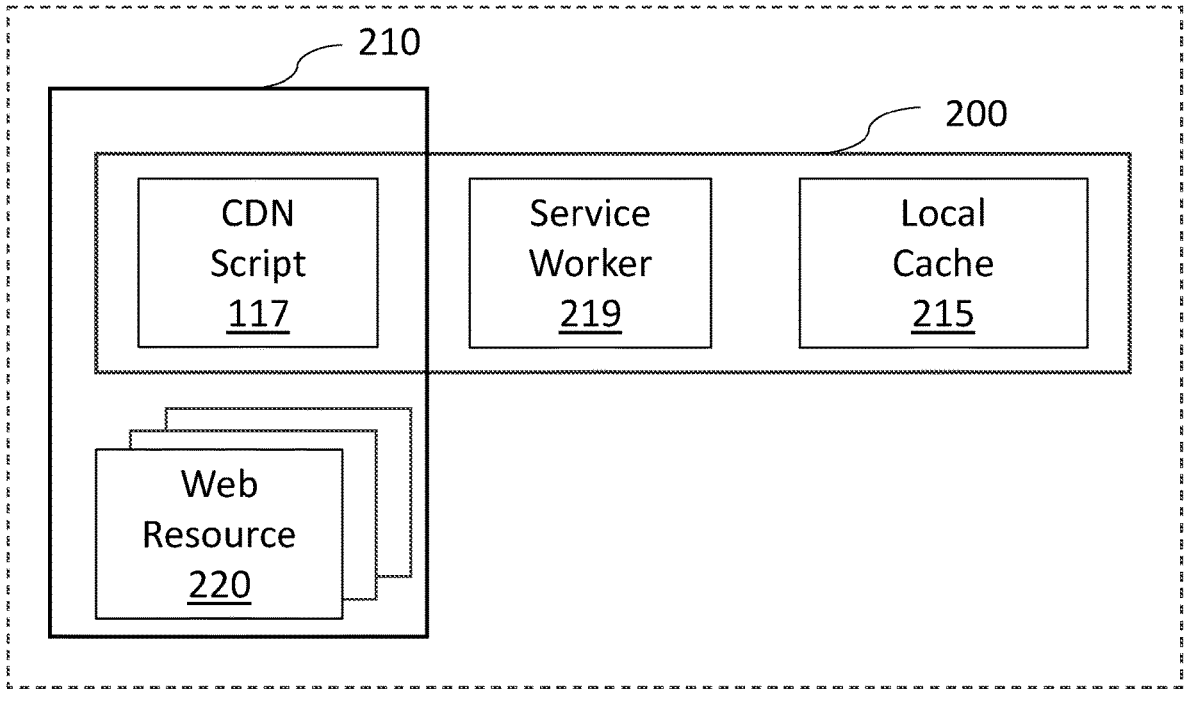

FIG. 2 is a diagram of components operable in the browser and utilized to explain the disclosed embodiments of a local CDN for accelerating web content delivery.

FIG. 3 is a flowchart illustrating a method for accelerating content delivery according to an embodiment.

Figure 4:
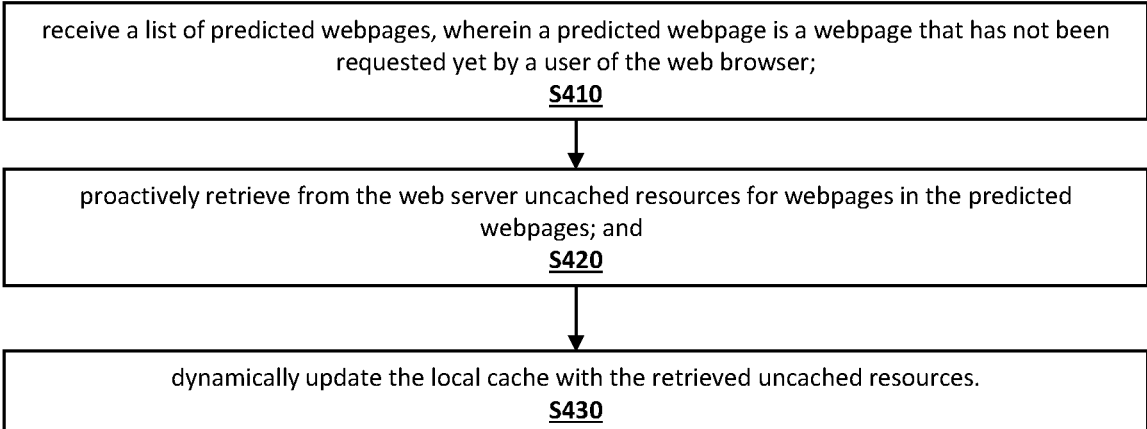

FIG. 4 is a flowchart illustrating a method for accelerating content delivery according to proactively caching resources according to an embodiment.

Figure 5:
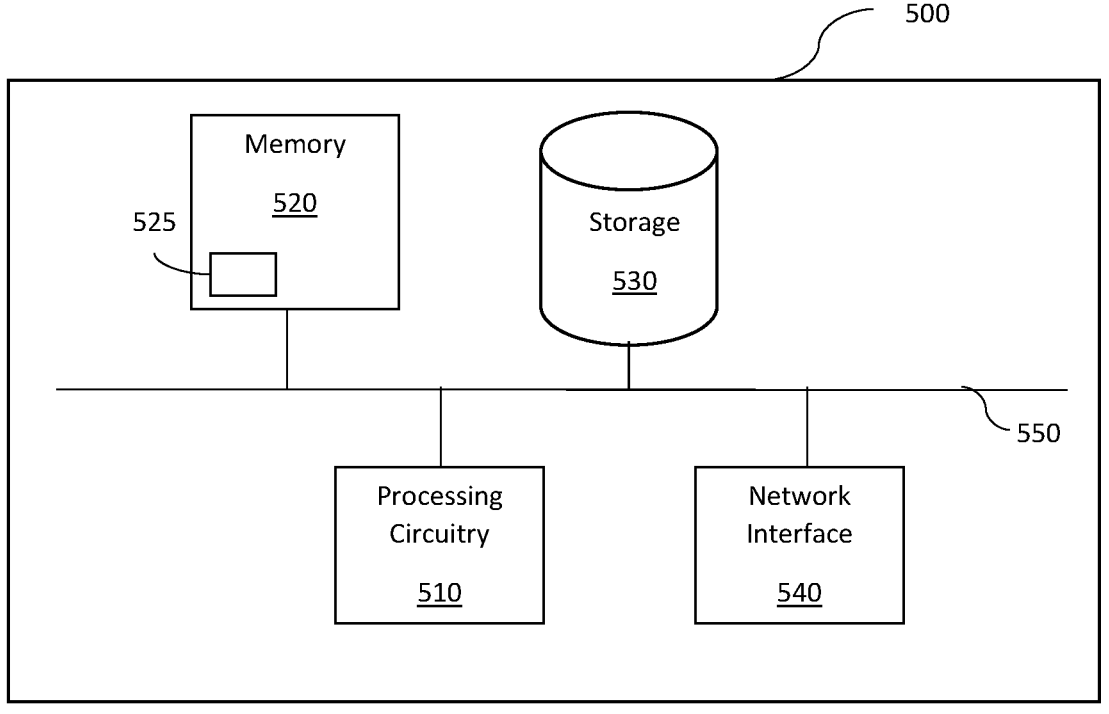

FIG. 5 is a block diagram of the hardware architecture of a prediction server.

DETAILED DESCRIPTION

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not others. In general, unless otherwise indicated, singular elements may be plural and vice versa with no loss of generality. In the drawings, like numerals refer to like parts through several views.

According to the disclosed embodiments, techniques for accelerating web content delivery using a local CDN are provided. In an embodiment, a local CDN is managed by an agent and service worker operable in a web server. The disclosed techniques include proactively retrieving the resources of webpages and locally caching such resources in a local CDN. The local CDN is a cache memory in a user's web browser. When a webpage is requested, the content of the webpage is delivered from the local CDN.

In an embodiment, the local CDN is often updated with cached resources. In yet another embodiment, the resources of webpages that the user is likely to request are retrieved and cached in the local CDN. Thus, when such webpages are requested, their respective content is delivered from the local CDN.

The disclosed embodiments allow for a reduction in the number of requests to an external CDN. As such, the cost of using external CDN services is significantly reduced as content can be delivered from the local cache. Further, as the content is served from a local cache, the disclosed embodiments allow for rendering the webpages substantially faster than if an external CDN had delivered them.

FIG. 1 shows an example network diagram 100 utilized to describe the various disclosed embodiments for accelerating web content delivery using a local CDN. The network diagram 100 illustrated in FIG. 1 includes a client device (or simply client) 110, a web server 120, a prediction server 140, and a CDN 150. The elements shown in FIG. 1 may be connected via a network, such as the Internet.

The client 110 may be a PC, a mobile phone, a smartphone, a tablet computer, a server, or any computing device that can access web content and the like. The client 110 is configured to execute a browser 115 (or any equivalent application). The web browser (or simply a browser) 115 is any software application configured to access the content stored or accessible through the web server 120. For example, the web server 120 may host a website for the browser 115 to render and display webpages of that website.

According to the disclosed embodiment, the browser 115 is configured to execute a CDN agent 117. In an embodiment, the CDN agent 117 is a piece of code downloaded from the prediction server 140 upon requesting web content from the web server 120. The code may include a script code, such as a JavaScript®. Furthermore, the web browser 115 is configured or operable to execute a service worker (not shown in FIG. 1).

A service worker is a process that enables applications to take advantage of persistent background processing, including hooks, to enable bootstrapping of web applications while offline. Further, a service worker allows cross-browser features, handling requests, modifying responses, and handling cache. Service workers are currently supported by modern web browsers, such as Internet Explorer® 11, Firefox®, Chrome®, and so on.

The web server 120 provides web content (e.g., webpages, media files, and the like) to the client 110 to be rendered and displayed by the browser 115. The web server 120 may include an application server, a web server, a streaming server, a database server, or any other type of server that provides content or information to the client 110.

The prediction server 140 is configured to predict the following webpage to be requested by a user of client 110. In an embodiment, the prediction is performed by collecting requests from all clients (only one is shown for simplicity) and applying a machine learning process to determine the following webpages to be requested. The predicted requests are personalized for a user or users of the client 110. In an embodiment, the prediction server 140 may include a code repository that provides the CDN agent to the client 110.

The CDN 150 is a distributed network of servers located in multiple data centers. As noted above, the CDN 150 delivers web content, such as images, videos, scripts, and other static or dynamic files, to users based on their geographical location. Typically, the interaction between the CDN 150 and the client 110 starts when a user enters a website URL or clicks on a link in their browser 115.

The browser 115 then requests the provided CDN's 150 IP address. In response, the CDN 150 checks its cache to see if it has a copy of the requested content. Upon a request for content from CDN 150, three outcomes can occur: the content is in the cache, and then CDN 150 delivers the requested content directly to the browser; the content is in the CDN's 150 cache but is expired, then the CDN may validate the content with the web server and fetch the "fresh" content; when the requested content is not in the CDN's 150 cache, the CDN fetches the content from the web server 120, caches the content, and then delivers it to the browser 115. The browser 115 receives the content (such as web pages, images, videos, etc.) from the CDN 150 and begins rendering the web page for the user. Note that for other resources on the page (such as scripts), the browser may make additional requests.

As mentioned above, traditional CDN services such as those discussed with reference to CDN suffer from high costs for delivering content and, in some instances, increased latency to a pick or high demand for content from a specific website. It is important to note that the CDN 150 services only specific website(s) or web application(s) hosted in web server 120, i.e., only for content providers that subscribed to and paid for such services.

To improve deficiencies of such traditional CDN services, the disclosed embodiments allow for providing local CDN services by the browser 115. As such, the number of requests for content from the CDN 150 is significantly reduced, thereby lowering the costs of content providers and improving the latency of the delivered content.

The local CDN (not shown in FIG. 1) disclosed herein allows the delivery of webpage content from browser 115. Thereby, the rendering of web pages is performed substantially without any latency.

The CDN agent 117 and a service worker 219 (not shown in FIG. 1) enable the local CDN 200. These elements allow the local caching at the browser's 115 cache (not shown) while dynamically updating the cached content. The various embodiments realized through the operation of CDN agent 117 and a service worker 219 are discussed in FIG. 2.

It is important to note that in FIG. 1, only one web server 120, prediction server 140, and client 110 are shown for simplicity. However, the disclosed embodiments can be applied to web servers 120, prediction servers 140, and clients 110. Moreover, the CDN 150 typically comprises numerous edge servers not depicted in FIG. 1.

Additionally, it should be noted that the prediction server 140 can be either a physical device or a virtual entity that runs on a physical device. A virtual entity can be a software container, a virtual machine, a serverless function, or other similar forms. The prediction server 140 can also be hosted on a cloud computing platform.

FIG. 2 is an example diagram of components operable in the browser 115 and utilized to explain the disclosed embodiments of a local CDN 200 for accelerating web content delivery.

As illustrated in FIG. 2, browser 115 renders a webpage 210, which may be an HTML page that includes one or more web resources (collectively labeled 220) in addition to the CDN agent 117. Resources 220 may include images, HTML code, CSS, audio files, video files, scripts, and so on. The CDN agent 117, in an embodiment, is also a script.

The CDN agent 117 is called and executed first on webpage 210. To this end, the webpage may include a code line calling for CDN agent 117. For example, the code line may include:

```
<link    href="css/cdn-agent.css"    rel="stylesheet"
    type="text/css">
```

To this end, the webpage 210 may be programmed by the website's developer first to call the CDN agent 117. In an embodiment, a service worker 219 is configured to capture a request to a web server 120 (FIG. 1) and redirect the request to the prediction server 140 (FIG. 1) to download the CDN agent 117.

Service worker 219 is a process executed in browser 115. As noted above, service worker 219 is a process that enables applications to take advantage of persistent background processing, including hooks, to enable bootstrapping of web applications while offline. Service worker 219 has access to the local cache 215 and the web (Internet).

The CDN agent 117, when executed, is configured to intercept any outgoing request for a webpage. This may include retrieving the URL from a user who enters a website URL or clicks on a link in their web browser. The CDN agent 117 is also configured to check if the webpage URL has changed in the visible browser tab.

The CDN agent 117 is programmed to query the service worker 219 to determine if cache 215 includes a copy of the requested content. If the content is cached in the cache 215, then the service worker 219 is configured to deliver the requested content directly to the browser 115.

In an embodiment, if the content is in the browser's local cache 215 but is expired, then the service worker 219 is programmed to validate the content with the web server and fetch the "fresh" content from the web server 120. In another embodiment, when the requested content is not in the local cache 215, the service worker is programmed to fetch the resources from the web server 120, cache the resources in the local cache 215, and then deliver it to the browser 115. The browser 115 receives the content (such as web pages, images, videos, etc.) from the local cache 215 and begins rendering the webpage 210 for the user. It should be noted that to retrieve resources on the webpage (such as scripts), the browser may make additional requests.

Webpage 210 includes multiple web resources 220. When retrieving the resources (content) from the web server 120, the web resources 220 are cached in the local cache 215. A cached resource is indexed together with a timestamp that the respective resource has been accessed and updated. For example, the indexing can be stored in a cached resource table having the following format:

TABLE 1

| Webpage (key) | Resource (key) | Access_Time | Update_Time | Cached |
|---|---|---|---|---|
| www.page1.com | ab.js | 00:00:10 | 00:01:10 | Yes |
| www.page1.com | cd.js | 00:00:27 | 00:02:10 | Yes |
| www.page2.com | ef.js | 00:27:27 | 01:02:10 | No |

In another embodiment, the new webpages and their resources are proactively retrieved. That is, the local cache 215 is populated with resources of webpages that have not been requested by a user of the client 110. The list of such webpages is requested by the CDN agent 117 from the prediction server 140. This allows rendering webpages, when requested by the user, from the local cache 215 without accessing the web server 120. For example, if the user currently views webpage www.page-2.com/news, a predicted webpage for the next one to be accessed by the user is www.page-2.com/sports, and the resources and/or content of www.page-2.com/sports are retrieved for the user.

To generate a list of predicted webpages (i.e., webpages that the user is likely to request), the CDN agent 117 provides the prediction server 140 with statistics on page visits by the user or users of the client 110. This may include the URLs visited by a user, the navigation history, the time spent on a webpage, the resources being clicked, and the like, or any combination thereof.

The prediction server 140 is configured to generate the predicted webpages by applying a machine learning algorithm on statistics gathered by a plurality of clients that accessed the web server 120. The methods for generating a list of predicted webpages are discussed below.

In one configuration, when executed, the CDN agent 117 is configured to load a service worker 219 from the main root of the website to handle any site request. The loaded service worker can capture any request sent from the web browser's tab, rendering the webpage 210.

It should be noted that CDN agent 117 is a piece of software code executed over the client (110, FIG. 1). A script is a high-level, often just-in-time compiled software code. The software shall be construed broadly to include any type of instructions. Instructions may include code (e.g., in source code format, binary code format, executable code format, or any other suitable code format). The instructions, when executed, cause the processing circuitry (e.g., embedded in the client device) to perform the various functions or processes of the CDN agent 117.

The prediction server 140 is configured to generate a list of predicted webpages for each client based on the received statistics data. This may include employing a machine learning algorithm on collected statistical data. The machine learning algorithm may include a supervised process, a semi-supervised process, an unsupervised process, or a combination thereof.

In an embodiment, when the unsupervised process is applied, the list of predicted webpages may be generated by normalizing or standardizing the collected data and converting the collected data into numerical representations, such as vectors. The prediction can be achieved by applying a clustering algorithm to the converted data. Examples of such a clustering algorithm may include K-means, DBSCAN, or hierarchical clustering to group similar browsing behavior patterns. From such patterns, the predictive list is generated. An alternative for the clustering algorithm may include generative models, such as GANs (Generative Adversarial Networks), to learn the distribution of historical browsing behavior patterns.

In an embodiment, when the unsupervised process is applied, the list of predicted webpages may be generated by normalizing or standardizing the collected data and converting the collected data into numerical representations, such as vectors. A model is trained on the browsing behavior patterns of multiple users. Once the model is trained, collected data is fed (e.g., list of URLs accessed by client 110) to predict the following likely URLs or webpages.

FIG. 3 is an example flowchart 300 illustrating a method for accelerating content delivery according to an embodiment.

The method may be performed by the CDN agent being executed by the browser as the webpage embedding the request is uploaded. It should be noted that the CDN agent, and hence the browser, are being executed over a client device. As noted above, such a device may include any computing device, including a processor and memory.

The CDN agent is injected into the browser (e.g., browser 115) in response to a request to access a webpage hosted on the web server. In an embodiment, the web resource may include a call to inject the CDN agent or the code of the CDN agent. As noted above, the CDN agent may be realized as a script, such as JavaScript®.

At S310, a service worker is injected for execution by the browser. The injected Service Worker is configured to capture all requests from the browser (or a browser tab) and transfer the captured requests to the CDN agent. The Service Worker is also configured to interface with the local cache.

At S320, a request to access a web server to render a webpage on the browser is captured. In an embodiment, the URL or domain name is the captured request. S310 may also include retrieving the URL from the browser's visible tab.

At S330, it is determined if resources in the requested webpage are cached locally at a cache memory of the web browser. Resources may include images, advertisements (ads), video streams, and the like. As another embodiment, the request may be for analytics.

The determination is made by comparing the URL to all URLs listed (or keyed) in the cached resource table.

At S330, cached resources locally cached at the web browser are retrieved. In an embodiment, S330 includes looking for fresh content. That is, checking if any cached resources are present, i.e., if a timestamp of the cached resources is current. It should be noted that current may be determined based on a preconfigured time interval.

At S340, the uncached resources are retrieved from the web server. In an embodiment, S340 may include retrieving the uncached resources from an external CDN. The retrieved uncached resources are cached in the local browser's cache, and the cached resource table is updated.

At S350, the requested webpage is rendered using the locally cached resources and the retrieved uncached resources.

At S360, on a predefined schedule, the cached resource table is scanned to determine which of the cached content should be updated. In an embodiment, checking if any cached resources are present, i.e., if a timestamp of the cached resources is current, and retrieving from a web server or an external CDN server. In an embodiment, S360 may include deleting from the local cache aged resources that have not been accessed or requested recently. For example, if a cached resource is of a webpage that has not been recently requested or not frequently requested, the cached resource is deleted from the local cache.

Accordingly, S360 may include first checking if a webpage having a cached resource has been recently accessed and, if so, checking if such a cached resource is present. A cached resource that has been accessed and has not been updated recently is being retrieved from either the web server or an external CDN server. A cached resource that has not been accessed recently is being deleted from the local cache. It should be noted that "present" may be a preconfigured parameter indicating a time period. It should be noted that two parameters may be defined: one for the present access time and the other for the present update time of a resource.

In an embodiment, the method disclosed in FIG. 3 includes determining if previously requested webpages have been modified, proactively retrieving from either the web server or an external CDN server any modified resource, and dynamically updating the local cache with the retrieved modified resources. The determination of which webpages to check for any modified resource is performed by looking at the webpages listed in the cached resource table.

In an embodiment, the method disclosed in FIG. 3 includes providing, to an external server, statistics on the navigation history of a user of the web browser. The statistics include browsing history per user, time spent on a visited webpage, and so on. The statistics are processed to generate a list of predicted web pages for a user. The predicted list is used to cache resources of the predicted webpages proactively.

FIG. 4 is an example flowchart 400 illustrating a method for accelerating content delivery according to proactively caching resources according to an embodiment.

At S410, a list of predicted webpages is received. A predicted webpage is a webpage that has yet to be requested by a user of the web browser during a browsing session of the user.

As noted above, the list of predicted webpages may be generated using machine learning algorithms.

At S420, it is checked if any resource designated in a predicted webpage is locally cached, and uncached resources for a predicted webpage are proactively retrieved from either a web server or an external CDN server.

At S430, the local cache with the retrieved uncached resources is updated. In an embodiment, S430 also includes updating the contents of the cached resource table.

It should be noted that proactively locally caching resources of webpages that a user is likely to request further accelerates the content delivery and rendering of the webpage.

FIG. 5 is an example block diagram of a hardware architecture 500 of a prediction server 140. In an embodiment, the client 110 is realized using the hardware architecture 500.

The hardware architecture 500 includes a processing circuitry 510 coupled to a memory 520, a storage 530, and a network interface 540. In an embodiment, the components of the client device (or simply "client") 110 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), GPUs, system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or any combination thereof. In one configuration, computer readable instructions needed to implement one or more embodiments disclosed herein may be stored in storage 530.

In another embodiment, the memory 520 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by one or more processors, cause the processing circuitry 510 to perform the various processes described herein. Specifically, the instructions, when executed, cause the processing circuitry 510 to generate identity key(s) by executing the script code as discussed above. In a further embodiment, the memory 520 may further include a memory portion 525, including the instructions.

The storage 530 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 530 may include various access policies and games.

It should be understood that the embodiments described herein are not limited to the specific architecture illustrated in FIG. 5 and that other architectures may be equally used without departing from the scope of the disclosed embodiments.

It should be further noted that the client device 110 and the prediction server 140 may be realized using a computing architecture similar to the architecture illustrated in FIG. 5, but that other architectures may be equally used without departing from the scope of the disclosed embodiments. Further, the memory 520 may include instructions for executing the function of the respective device, e.g., a client device 110 or the prediction server 140.

The various embodiments disclosed herein can be implemented as any combination of hardware, firmware, and software. Moreover, the software is preferably implemented as an application program tangibly embodied on a program storage unit or computer readable medium. The application program may be uploaded to and executed by a machine comprising any suitable architecture. Preferably, the machine is implemented on a computer platform having hardware such as one or more central processing units ("CPUs"), memory, and input/output interfaces. The computer platform may also include an operating system and a microinstruction code. The various processes and functions described herein may be either part of the microinstruction code or part of the application program or any combination thereof, which may be executed by a CPU, whether or not such computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for accelerating web content delivery, comprising:
capturing a request to access a webpage hosted by a web server, the request is initiated by a web browser;
determining if there are resources in the requested webpage cached locally at a cache memory of the web browser;
retrieving cached resources that are locally cached at the web browser, wherein the cached resources that are locally cached at the web browser include resources of predicted webpages for the browser that were pre-loaded by a content delivery network (CDN) agent of the web browser into the cache memory of the web browser due to their being predicted by a prediction server that is remote from the web browser, wherein each predicted webpage is a webpage that has not been requested yet by a user of the web browser;
retrieving uncached resources from the web server; and
rendering the webpage on the webpage from the cached resources and the uncached resources.

2. The method of claim 1, further comprising:
caching the retrieved uncached resources in the cache memory of the web browser; and
updating a cached resource table indicating attributes related to the retrieved uncached resources.

3. The method of claim 2, wherein the attributes related to a cached resource includes: a webpage including the cached resource, a resource name, an access time of a resource, and a timestamp of a last update.

4. The method of claim 3, further comprising:
determining if a previously requested webpage has been modified;
proactively retrieving from the web server modified resources; and
dynamically updating the cached resources with the retrieved modified resources.

5. The method of claim 1, further comprising:
receiving from the prediction server a list of predicted webpages;
proactively retrieving from the web server by the CDN agent of the web browser uncached resources for webpages in the predicted webpages; and
dynamically updating the local cache with the retrieved uncached resources.

6. The method of claim 5, further comprising:
providing statistics on a navigation history of a user of the web browser to the prediction server.

7. The method of claim 6, further comprising:
providing statistics on the navigation history of users of a plurality of browsers other than the web browser to the prediction server.

8. The method of claim 1, further comprising:
initiating a service worker on the web browser; and
controlling, by the CDN agent, the service worker to update the cache.

9. The method of claim 1, wherein retrieving the locally cached resources further comprises:
at a predefined schedule, checking a timestamp indicating a recent update time for each cached resource to determine aging cached resource; and
dynamically updating aged, cached resources.

10. The method of claim 1, wherein retrieving the uncached resources from the web server further comprises:
retrieving the uncached resources from an external CDN server.

11. The method of claim 1, wherein the prediction server applies a machine learning algorithm to statistics gathered by a plurality of browsers other than the web browser that accessed the web server to predict the predicted webpages.

12. The method of claim 1, further comprising:
injecting, by an external CDN server, the CDN agent into the web browser in response to the request to the web server.

13. A non-transitory computer-readable medium storing a set of instructions for accelerating web content delivery, the set of instructions comprising:
one or more instructions that, when executed by one or more processors of a device, cause the device to:
capture a request to access a webpage hosted by a web server, the request is initiated by a web browser;
determine if there are resources in the requested webpage cached locally at a cache memory of the web browser;
retrieve cached resources that are locally cached at the web browser, wherein the cached resources that are locally cached at the web browser include resources of predicted webpages for the browser that were pre-loaded by a content delivery network (CDN) agent of the web browser into the cache memory of the web browser due to their being predicted by a prediction server that is remote from the web browser, wherein each predicted webpage is a webpage that has not been requested yet by a user of the web browser;

retrieve uncached resources from the web server; and render the webpage on the webpage from the cached resources and the uncached resources.

14. A system for accelerating web content delivery comprising:

one or more processors configured to:

capture a request to access a webpage hosted by a web server, the request is initiated by a web browser;

determine if there are resources in the requested webpage cached locally at a cache memory of the web browser;

retrieve cached resources that are locally cached at the web browser, wherein the cached resources that are locally cached at the web browser include resources of predicted webpages for the browser that were pre-loaded by a content delivery network (CDN) agent of the web browser into the cache memory of the web browser due to their being predicted by a prediction server that is remote from the web browser, wherein each predicted webpage is a webpage that has not been requested yet by a user of the web browser;

retrieve uncached resources from the web server; and render the webpage on the webpage from the cached resources and the uncached resources.

15. The system of claim 14, wherein the one or more processors are further configured to:

cache the retrieved uncached resources in the cache memory of the web browser; and update a cached resource table indicating attributes related to the retrieved uncached resources.

16. The system of claim 15, wherein the attributes related to a cached resource includes:

a webpage including the cached resource, a resource name, an access time of a resource, and a timestamp of a last update.

17. The system of claim 16, wherein the one or more processors are further configured to:

determine if a previously requested webpage has been modified;

proactively retrieve from the web server modified resources; and dynamically update the cached resources with the retrieved modified resources.

18. The system of claim 14, wherein the one or more processors are further configured to:

receive from the prediction server a list of predicted webpages;

proactively retrieve from the web server by the CDN agent of the web browser uncached resources for webpages in the predicted webpages; and dynamically update the local cache with the retrieved uncached resources.

19. The system of claim 18, wherein the one or more processors are further configured to:

provide statistics on a navigation history of a user of the web browser to the prediction server.

20. The system of claim 19, wherein the one or more processors are further configured to:

provide statistics on the navigation history of users of a plurality of browsers other than the web browser to the prediction server.

21. The system of claim 14, wherein the one or more processors are further configured to:

initiate a service worker on the web browser; and control, by the CDN agent, the service worker to update the cache.

22. The system of claim 14, wherein the one or more processors, when retrieving the locally cached resources, are configured to:

at a predefined schedule, check a timestamp indicating a recent update time for each cached resource to determine aging cached resource; and dynamically update aged, cached resources.

23. The system of claim 14, wherein the one or more processors, when retrieving the uncached resources from the web server, are configured to:

retrieve the uncached resources from an external CDN server.

24. The system of claim 14, wherein the prediction server applies a machine learning algorithm to statistics gathered by a plurality of browsers other than the web browser that accessed the web server to predict the predicted webpages.

25. The system of claim 14, wherein the one or more processors are further configured to:

inject, by an external CDN server, the CDN agent into the web browser in response to the request to the web server.

* * * * *